H. C. TRIPP.
UNDERFEED STOKER.
APPLICATION FILED APR. 15, 1910.

997,220.

Patented July 4, 1911.

4 SHEETS—SHEET 1.

WITNESSES

INVENTOR
Harry C. Tripp
By Fred'k W. Winter
Attorney

H. C. TRIPP.
UNDERFEED STOKER.
APPLICATION FILED APR. 15, 1910.

997,220.

Patented July 4, 1911.
4 SHEETS—SHEET 2.

H. C. TRIPP.
UNDERFEED STOKER.
APPLICATION FILED APR. 15, 1910.

997,220.

Patented July 4, 1911.
4 SHEETS—SHEET 3.

WITNESSES

INVENTOR.

H. C. TRIPP.
UNDERFEED STOKER.
APPLICATION FILED APR. 15, 1910.
997,220.
Patented July 4, 1911.
4 SHEETS—SHEET 4.
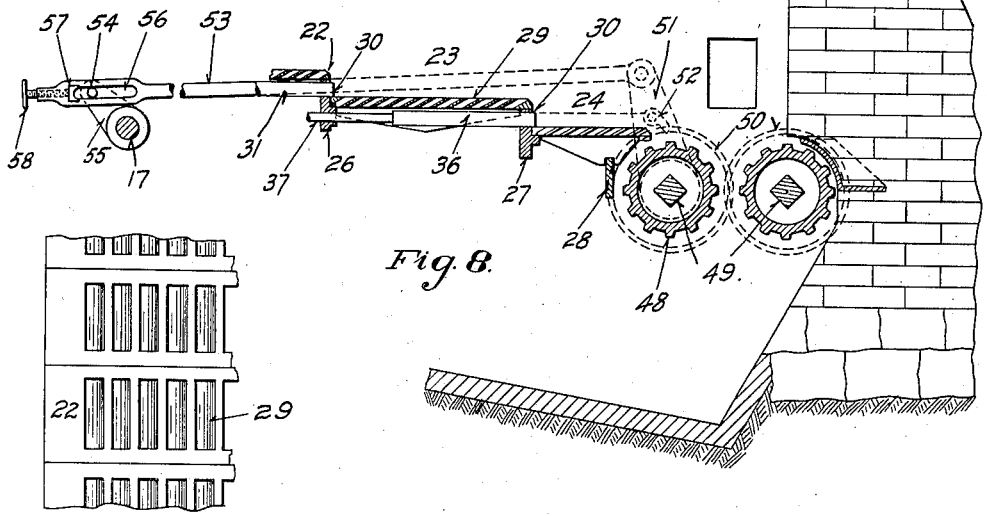
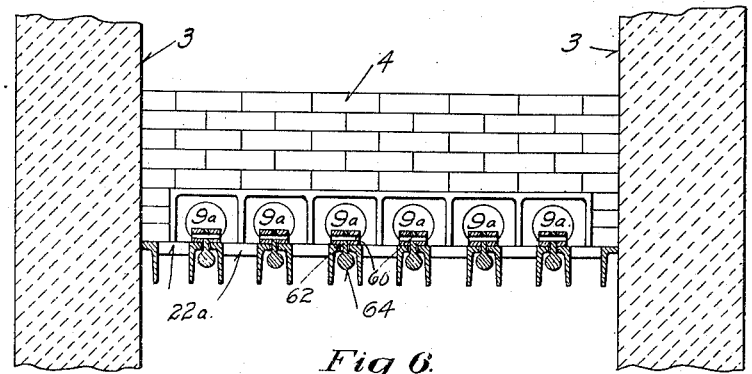
WITNESSES.
INVENTOR.
Harry C. Tripp.
By Fred'k W. Winter
Attorney

UNITED STATES PATENT OFFICE.

HARRY C. TRIPP, OF NEW YORK, N. Y.

UNDERFEED STOKER.

997,220. Specification of Letters Patent. Patented July 4, 1911.

Application filed April 15, 1910. Serial No. 555,598.

*To all whom it may concern:*

Be it known that I, HARRY C. TRIPP, a resident of New York, in the county of New York and State of New York, have invented a new and useful Improvement in Underfeed Stokers, of which the following is a specification.

This invention relates to boiler furnaces and grates, and particularly to mechanical stokers for steam boiler and similar furnaces for both stationary and locomotive boilers.

The object of the invention is to provide a grate construction and mechanical stoker in which the fuel is delivered below the zone of combustion preferably for the full width of the furnace, and is uniformly distributed upwardly over the entire furnace area to the zone of combustion; which provides for the uniform diffusion of air through the bed of fuel over the entire furnace area, so that the volatile gases which are distilled from the green fuel are thoroughly mixed with air and on passing through the zone of combustion above are consumed without smoke, with a minimum excess of air and with consequent maximum efficiency; which provides for delivery of ash and refuse to the rear of the furnace below the zone of combustion, and provides for under cleaning or the mechanical removal of ash and refuse from underneath without disturbing or interfering with the combustion above.

The special advantages of the invention and the features of construction and arrangement whereby they are obtained will appear from the description hereinafter made.

The invention comprises the construction and arrangement of parts hereinafter described and claimed.

Figure 2:
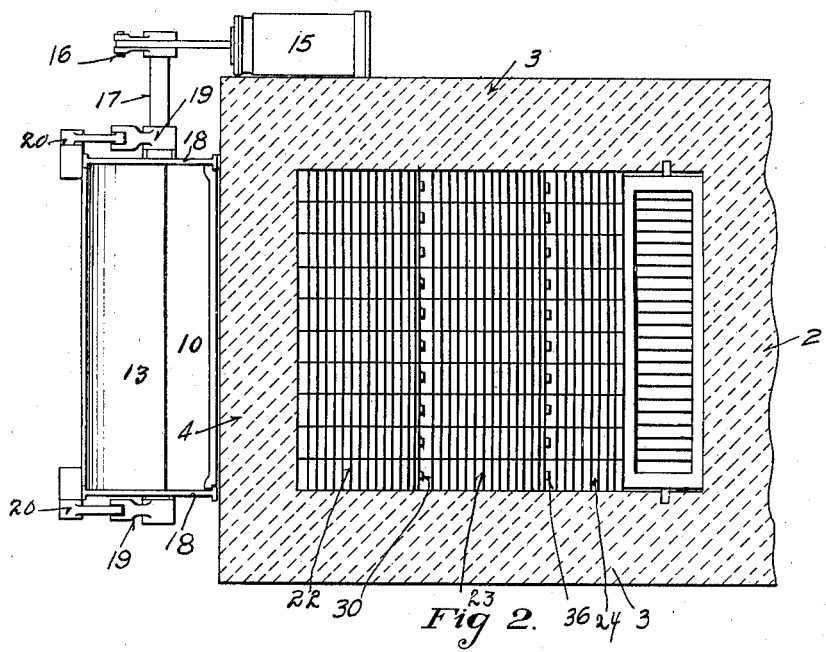
Figure 1:
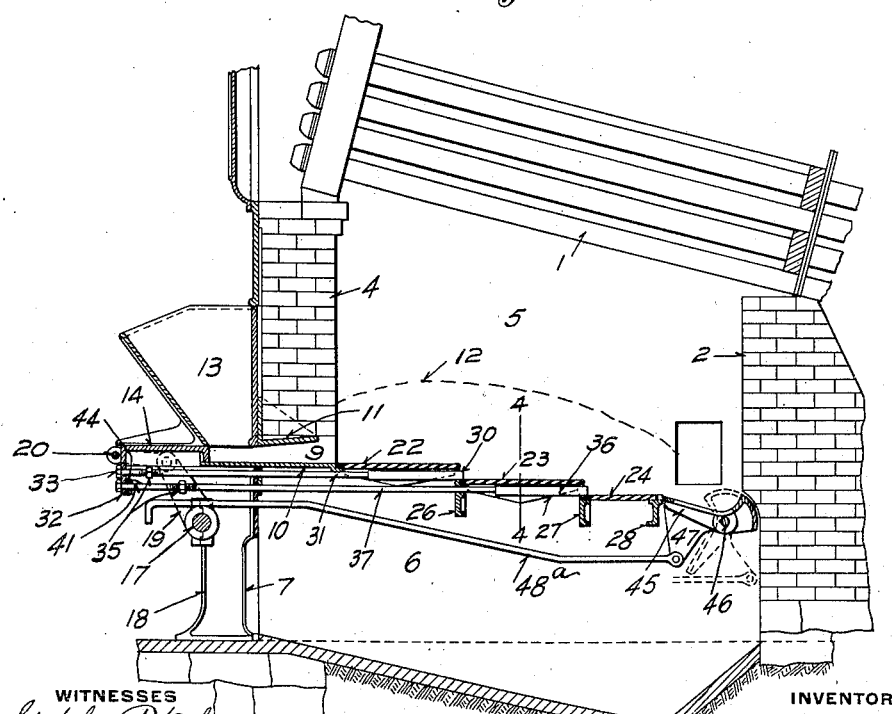
Figure 3:
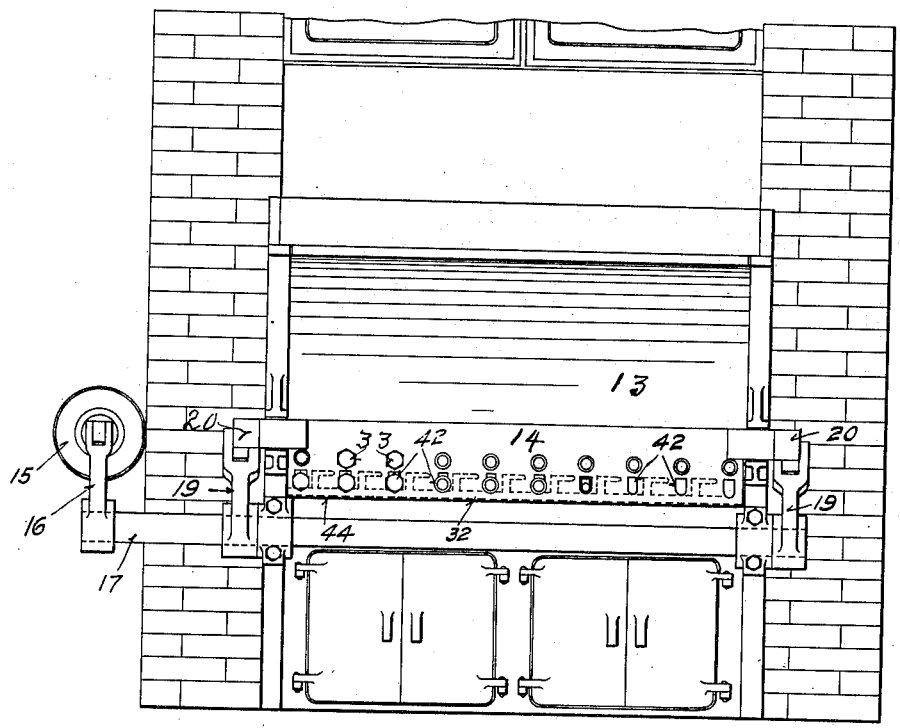
Figure 4:
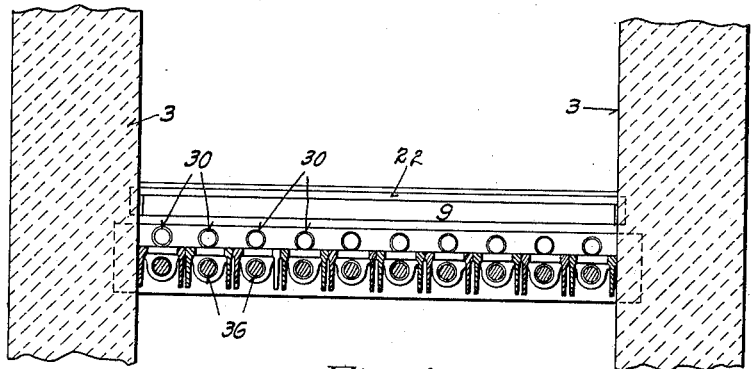
Figure 7:
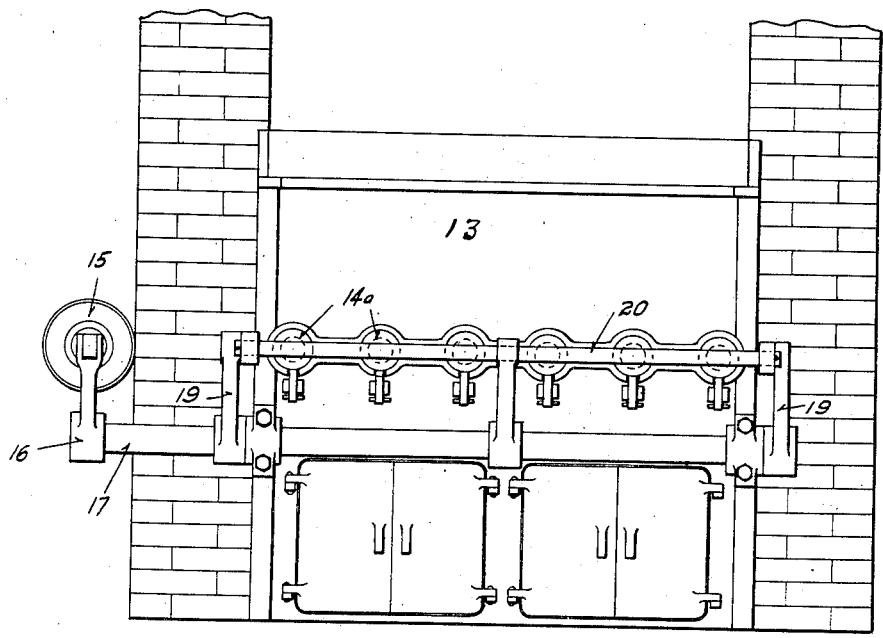
Figure 5:
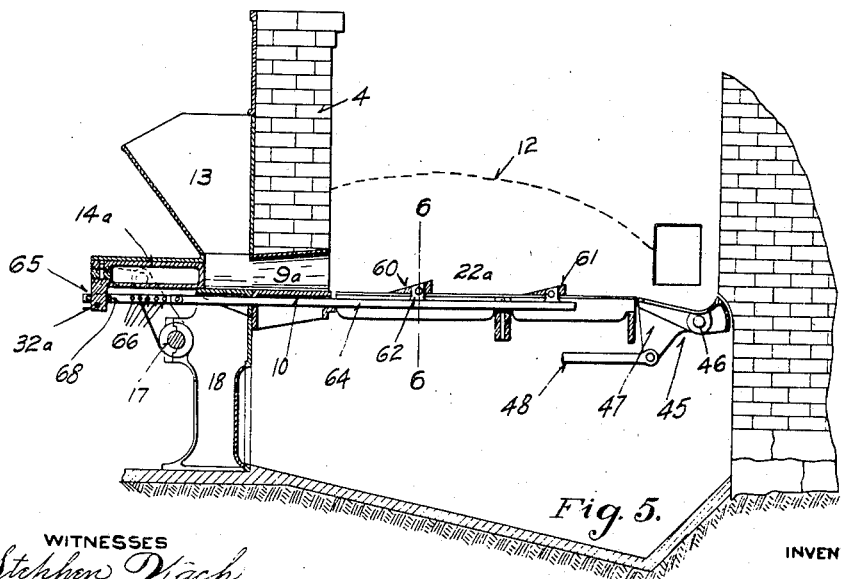

In the accompanying drawings Figure 1 is a vertical longitudinal section through one type of steam boiler furnace showing the invention applied thereto; Fig. 2 is a horizontal section through the same showing the grate and stoker mechanism in plan view; Fig. 3 is a front view of the furnace and stoker mechanism; Fig. 4 is a vertical transverse section taken on the line 4—4, Fig. 1; Fig. 5 is a vertical longitudinal section showing a modification; Fig. 6 is a vertical section taken on the line 6—6, Fig. 5; Fig. 7 is a front view of the furnace showing the modification of Fig. 5; Fig. 8 is a vertical longitudinal section showing a modified form of cleaning device; Fig. 9 is a detail sectional view through one of the grate bars on an enlarged scale; and Fig. 10 is a detail plan view of a portion of the grate.

In the drawings the invention has been shown applied to a furnace for a Babcock and Wilcox or similar type of water tube boiler. The boiler tubes are indicated at 1, the bridge wall at 2, the side walls of the furnace chamber at 3 and the front wall at 4. The furnace chamber is divided by the grate into a combustion chamber 5 and ash pit 6 underneath the grate. The latter is provided with the ash removing door 7. These parts, except the grate, can be of any construction and design.

The front wall 4 is provided with the fuel supply opening or openings. Figs. 1 to 4 show a single lateral or horizontal fuel opening 9 extending entirely across the width of the furnace, while Figs. 5 to 7 indicate a series of smaller openings $9^a$ placed side by side and separated by supports for the front wall. In case the furnace is narrow the single opening of Figs. 1 to 4 becomes practical, although even in this case it is not necessary, but with a wide furnace some support for the brick work above must be supplied intermediate the sides, and hence for such furnace a number of openings side by side are preferred. The bottom of fuel supply opening 9, Figs. 1 to 4, is formed by a dead plate 10, and the brick work above the opening is supported on angle plate 11. In all cases the fuel delivery opening or openings 9 is or are of less height than the bed of fuel on the grate, said bed of fuel being indicated at 12, so that fuel forced through the fuel delivery opening enters the fuel bed along the surface of the grate and below the zone of combustion.

Outside the front wall 4 is a fuel hopper 13, whose bottom is formed by an outward extension of the dead plate 10. The rear wall of the hopper is open at its bottom and communicates with the fuel delivery opening or openings 9 or $9^a$. The pusher plate 14, Fig. 1, or a series of pusher rams $14^a$, Figs. 5 and 7, moves over the bottom of the hopper and pushes the fuel out of the latter and through the fuel delivery opening or openings 9 or $9^a$. The number of such pusher plates or rams will correspond to the number of fuel feeding openings. The pusher plate or rams may be actuated in any suitable way. As shown the same are actuated by means of a power cylinder 15 arranged at one side of the furnace and having its piston rod connected to a crank 16 on a rock shaft 17 mounted in the side frames 18. This rock shaft is provided with one or more crank arms 19 connected to a rod 20 carried by the pusher plate or rams. By this mechanism the pusher plate or rams are reciprocated to force the fuel into the furnace. In the construction illustrated the side frames 18 extend upwardly and form the ends of a hopper, the front and rear walls of the hopper being secured between the side frames. This, however, is a detail of construction which can be varied as desired.

The fuel delivery opening or series of fuel delivery openings extend laterally for the full width of the furnace and the grate is practically a flat or level grate, and extends straight across from side to side of the furnace. In the form shown in Figs. 1 to 4 the grate from front to rear is composed of a series of sections arranged in stepped relation, being shown at successively lower levels from front to rear. It is shown as composed of three sections, namely, a front section 22 which is on a level with the dead plate 10, an intermediate section 23 somewhat lower than section 22, and a rear section 24 also somewhat lower than section 23. Each of these sections is flat or straight from side to side of the furnace, and each is shown as practically horizontal, although they might slope slightly upwardly from front to rear, or even in the reverse direction. These sections are supported upon the cross bearers 26, 27 and 28 and upon the inner edge of dead plate 10, as shown in Fig. 1.
The grate plates may be of any desired construction, being shown as provided with inclined air ports 29 therethrough, in order to eliminate the sifting of coal therethrough and to offer less resistance to the pushers reciprocating over them.

Projecting through openings in the forward bearer 26 and adapted to pass over the grate section 23 are a series of rams 30 having pusher rods 31 secured thereto and extending forward and passing through openings in a downwardly projecting flange or series of lugs 32 on pusher plate 14. A head or nut 33 is provided on each pusher rod 31 outside of the flange 32, while inside of said flange each pusher rod is provided with an adjustable collar, shown as a nut 35 threaded thereon and thereby adjustable in order to vary the point at which the rams 30 are caused to move with the feeding pusher plate 14 or rams 14ª. The nut 33 on the outer end of the rod is for the purpose of drawing said rods out of the fire to the same distance at each stroke, while the extent of inward movement of said rams is varied by adjusting the nuts 35. The bearer 27 is likewise provided with openings and projecting through the same and over the grate section 24 are a series of rams 36 each of which is provided with a pusher rod 37 also projecting through openings in the flange 32 of pusher plate 14. These rods at their outer ends are also provided with nuts 33, and inside of the flange with adjustable nuts 35 but located farther away from the flange 14 than the corresponding nuts on the pusher rods 31. In addition the rods 37 are provided near their ends with shoulders 41 and the holes 42 in flange 32 are sufficiently large to permit said shoulders to pass therethrough, so that ordinarily the pushers 36 are not actuated until the flange 32 contacts with nuts 35. When, however, it is desired to give rams 36 a full stroke in order to push all refuse off the grate sections 24, a gag in the form of a sliding plate 44 is pushed between the flange 32 and shoulders 41.

At the rear of the grate I provide means for delivering the ash and clinker into the ash pit. In Figs. 1 to 4 this is shown as a dump grate 45, pivotally mounted at 46 and provided with an arm 47 to which is connected an actuating rod 48. When it is desired to clean the grate the pushers 36 are given one or more full strokes, if necessary, to deliver the refuse onto the grate section 45, and then said grate section 45 is tipped to dump the refuse.

Fig. 8 shows a modification in which the cleaning device comprises a pair of delivery and crushing rollers 48 mounted on transverse shafts 49 fluted or provided with longitudinal ribs so that they grip the ash and clinker and crush the latter so it can be handled by an ash conveyer. These rollers may be driven in any suitable way. As shown, they are provided with intermeshing spur gears 50 to cause the rollers to rotate simultaneously, and on one of the shafts is mounted a swinging arm 51 carrying a pawl 52 adapted to engage the teeth of spur gear 50, the latter acting as a ratchet wheel. The arm 51 has connected thereto a reach rod 53, the forward end of which is connected to a wrist pin 54 on a crank arm 55 or rock shaft 17. The reach rod is provided with a slot 56 in which the wrist pin works, so that the reach rod is not actuated until the wrist pin reaches either end of said slot. To vary the amount of the rotation of the rollers 48 and thereby vary the rate of delivery of the ash, adjusting means are provided, that shown comprising a block 57 in the slot 56 and adjustable longitudinally therein by means of a screw 58, whereby the length of slot 56 can be varied and the extent of reciprocation of reach rod 53 correspondingly varied.

The special form of grate shown in Figs. 1 to 4 enables the pushers 30 and 36 to be protected underneath the grate sections the 1??

greater period of time and therefore withdrawn from the action of the heat. The steps in the grate are only slight and for all purposes the grate is flat from front to rear. Figs. 5 to 7, however, show a construction in which the grate 22ᵃ is perfectly flat from front to rear and the pushing rams are in the form of triangular blocks 60 and 61 secured to projections 62, carried by reciprocating rods 64 and extending through slots in the grate bars. The rods 64 extend through openings in flange 32ᵃ on pusher plate 14 or on rams 14ᵃ and at their outer ends are provided with cross pins 65, which serve the same purpose as nuts 33 in the other modification. Inside of the flange 32ᵃ said rods are provided with a series of openings 66 for receiving a pin, which serves the purpose of the nuts 35 on the pusher rods in the other modifications. The extent of stroke of rod 64 is varied according to the hole 66 into which the pin is inserted. The rods are also provided with another hole 68 immediately inside of flange 32ᵃ into which a pin can be inserted and serve as a gag to give said rod 64 a long stroke whenever it is desired to clean the grate. This modification also shows the series of feeding rams 14ᵃ, these being shown as circular and connected at their outer ends to the transverse bar 20.

In all cases the grate is limited to such an inclination from front to rear as will maintain the necessary resistance to the rearward movement of the fuel to cause its upward distribution into the zone of combustion.

In both forms illustrated the delivery plates or rams are of such relative small size as to deliver the fuel below the zone of combustion. The fuel feeding and advancing mechanism in both forms also has a decreasing carrying capacity toward the rear. In both forms the pusher plates 14 or feed rams 14ᵃ are of larger size and have a longer stroke than any of the subsequent feeding pushers or rams. In Figs. 1 to 4 the forward rams 30 while having a shorter stroke and being of smaller size than pusher plate 14 nevertheless have a greater feeding capacity than rams 36 due to their longer strokes on account of having the nuts 35 closer to flange 32 than the corresponding nuts of pushers 36. In the modification shown in Fig. 5 the decreased carrying capacity toward the rear is secured by making the rear pusher blocks 61 of smaller size than the forward pusher blocks 60. Consequently in both forms there is a decreased carrying capacity from front toward the rear of the furnace. This is essential in order that the mass of fuel shall not be moved *en masse* from front to the rear of the grate, but on the contrary the resistance to the rearward feed of the fuel on account of this lesser feeding or carrying capacity of the mechanism causes the fuel which is delivered along the grate below the zone of combustion to move upwardly or in the line of least resistance, and consequently we have strictly speaking an underfeed stoker. The line of fuel feed is indicated by the arrows on Figs. 1 and 5. Hence it is possible to maintain a bed of fuel of greater height than the fuel delivery opening or openings 9. Each particle of coal has a vertical as well as a horizontal travel and this upward delivery of the coal is maintained over the entire grate surface and is due to the resistance of the moving of the coal toward the rear which is maintained by the decreasing displacement of the auxiliary pushers. Consequently the coal is delivered into the zone of combustion from below exactly as in the usual underfeed stokers, securing more perfect combustion, and less smoke than with top feeding. Furthermore, the grate is largely protected from the heat of the fire, the grate in the forward portion of the furnace being covered by a layer of green fuel, that in the rear portion by a bed of ash, while that in the center is protected by a layer of ash and above the same a layer of green coal. In the combustion of bituminous coal and lignite the refuse always finds its way downwardly and collects on the fuel bearing surface. Such refuse is pushed toward the rear or cleaning opening by the pushers, and by providing for an occasional full stroke for the rearmost pushers or rams the refuse and clinker can be positively pushed off the grate and into the cleaning opening. By adjusting the nuts 35 or pins 67 any desired extent of stroke of the pushers can be secured so as to uniformly distribute the coal and secure a uniform thickness or bed of fuel over the entire grate. This insures uniform resistance to the passage of the air through the fuel and largely increases the capacity of the furnace over all prior underfeed furnace constructions in which the coal is fed in through retorts and forms a mound with very great nonuniformity in distribution and in fire.

My furnace is the first to secure underfeeding on a substantially flat grate, and with an unbroken bed of uniform thickness from side to side, and the first to provide on a flat grate for the delivery of the fuel below the line of combustion and cause the fuel to gradually work upwardly, being first coked and then consumed. In effecting this result an absolutely horizontal grate from front to rear is not necessary. The inclination, however, should not be so great that the effect of gravity will reduce the resistance to the rearward feeding of the fuel to such an extent as to prevent the fuel from moving upwardly into the zone of combustion.

What I claim is:

1. The combination with a substantially flat grate forming the entire fuel support, of delivery and distributing means for delivering fuel onto the grate at the front thereof and below the zone of combustion for the full width of the furnace and feeding the same toward the rear of the furnace, said delivery and distributing means having decreasing carrying capacity toward the rear end of the grate, whereby the resistance to the rearward movement of the fuel causes the fuel on the grate to be distributed upwardly to the zone of combustion.

2. The combination with a substantially flat grate forming the entire fuel support, of delivery means delivering fuel onto the grate at the front thereof and below the zone of combustion and for the full width of the furnace, and an auxiliary means for carrying the fuel rearwardly along the grate for the full width of the furnace and below the zone of combustion, said auxiliary means having a lesser carrying capacity than the primary delivery means, whereby the resistance to the rearward movement of the fuel causes a portion of the fuel on the grate between the primary and auxiliary delivery means to be distributed upwardly to the zone of combustion.

3. The combination with a substantially flat grate forming the entire fuel support, of delivery means delivering fuel onto the grate at the front thereof and below the zone of combustion and for the full width of the furnace, an auxiliary delivery means for carrying the fuel rearwardly along the grate for the full width of the furnace and below the zone of combustion, said auxiliary delivery means having a lesser carrying capacity than the primary delivery means, whereby the resistance to the rearward movement of the fuel causes a portion of the fuel on the grate between the primary and auxiliary delivery means to be distributed upwardly to the zone of combustion, and means for varying the extent of movement of said auxiliary delivery means.

4. The combination with a substantially flat grate forming the entire fuel support, of delivery means delivering fuel onto the grate at the front thereof and below the zone of combustion and for the full width of the furnace, auxiliary delivery means for carrying the fuel rearwardly along the grate for the full width of the furnace and below the zone of combustion, said auxiliary delivery means having a lesser carrying capacity than the primary delivery means, whereby the resistance to the rearward movement of the fuel causes a portion of the fuel on the grate between the primary and auxiliary delivery means to be distributed upwardly to the zone of combustion, said auxiliary delivery means having a lost motion connection with the actuating means.

5. The combination with a grate, of a delivery means delivering fuel onto the grate below the zone of combustion for the full width of the furnace, auxiliary delivery means for carrying fuel along the grate for the full width of the furnace below the zone of combustion, said auxiliary means having a lost motion connection with the actuating mechanism and being of less carrying capacity than the primary delivery means, thereby causing a portion of the fuel on the grate between the primary and auxiliary means to be distributed upwardly to the zone of combustion, and a gag arranged to be interposed in the lost motion connection to give said auxiliary delivery means a full stroke to push the refuse from the grate, and from underneath the bed of fire above.

6. The combination with a substantially flat grate forming the entire fuel support, of delivery means delivering fuel onto the grate at the front thereof and below the zone of combustion and for the full width of the furnace, two successive auxiliary delivery means for carrying the fuel rearwardly along the grate for the full width of the furnace and below the zone of combustion, the first of said auxiliary delivery means having a lesser carrying capacity than the primary delivery means and the second auxiliary delivery means having a lesser carrying capacity than the first auxiliary delivery means, whereby the resistance to the backward movement of the fuel causes portions of the fuel on the grate between the primary delivery means and the first auxiliary delivery means and between the first auxiliary delivery means and the second auxiliary delivery means to be distributed upwardly to the zone of combustion.

7. The combination with a substantially flat grate forming the entire fuel support, of delivery means for delivering fuel onto the grate at the front thereof and below the zone of combustion and for the full width of the furnace, two sets of auxiliary delivery means for carrying the fuel rearwardly along the grate for the full width of the furnace and below the zone of combustion, the second auxiliary delivery means also delivering the ash and refuse to the rear of the grate below the zone of combustion, said first auxiliary delivery means having a lesser carrying capacity than the primary delivery means, and said second auxiliary delivery means having a lesser carrying capacity than the first auxiliary delivery means, whereby the resistance to the backward movement of the fuel causes portions of the fuel on the grate between the primary and first auxiliary means and between the first and second auxiliary means to be distributed upwardly to the zone of combustion, and means for, at will, producing greater than normal movement of the second auxiliary delivery means.

8. The combination with a substantially flat grate forming the entire fuel support, of delivery means delivering fuel onto the grate at the front thereof and below the zone of combustion and for the full width of the furnace, auxiliary delivery means for carrying fuel rearwardly along the grate for the full width of the furnace and below the zone of combustion, said auxiliary delivery means having a lesser carrying capacity than the primary delivery means, whereby the resistance to the backward movement of the fuel causes a portion of the fuel on the grate between the primary and auxiliary delivery means to be distributed upwardly to the zone of combustion, and refuse delivery means at the rear of the grate.

9. The combination with a substantially flat grate forming the entire fuel support, of delivery means delivering fuel onto the grate at the front thereof and below the zone of combustion and for the full width of the furnace, auxiliary delivery means for carrying the fuel rearwardly along the grate for the full width of the furnace and below the zone of combustion, said auxiliary delivery means having a lesser carrying capacity than the primary delivery means, whereby the resistance to the backward movement of the fuel causes a portion of the fuel on the grate between the primary and auxiliary delivery means to be distributed upwardly to the zone of combustion, and refuse delivery means arranged to remove the refuse from underneath the bed of the fire without interfering with the combustion of the fire bed above.

In testimony whereof, I have hereunto set my hand.

HARRY C. TRIPP.

Witnesses:
  CHAS. W. McHOSE,
  F. W. WINTER.